(12) United States Patent
Manoukian et al.

(10) Patent No.: US 10,435,168 B2
(45) Date of Patent: Oct. 8, 2019

(54) SYSTEM AND METHOD FOR CONTROLLING A POSITION OF AN AUXILIARY POWER UNIT INLET DOOR

(71) Applicant: PRATT & WHITNEY CANADA CORP., Longueuil (CA)

(72) Inventors: Patrick Manoukian, Saint-Laurent (CA); Sarah Theriault, Montreal (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 400 days.

(21) Appl. No.: 15/440,514

(22) Filed: Feb. 23, 2017

(65) Prior Publication Data

US 2018/0237149 A1    Aug. 23, 2018

Related U.S. Application Data

(60) Provisional application No. 62/461,053, filed on Feb. 20, 2017.

(51) Int. Cl.
| | |
|---|---|
| *B64D 33/02* | (2006.01) |
| *F02C 7/042* | (2006.01) |
| *B64D 41/00* | (2006.01) |
| *B64D 45/00* | (2006.01) |

(52) U.S. Cl.
CPC ............ *B64D 33/02* (2013.01); *B64D 41/00* (2013.01); *B64D 45/0005* (2013.01); *F02C 7/042* (2013.01); *B64D 2033/0213* (2013.01); *B64D 2041/002* (2013.01); *F05B 2220/50* (2013.01); *F05B 2260/80* (2013.01)

(58) Field of Classification Search
None
See application file for complete search history.

(56) References Cited

U.S. PATENT DOCUMENTS

| | | | |
|---|---|---|---|
| 6,272,838 B1 | 8/2001 | Harvell et al. | |
| 6,901,737 B2 | 6/2005 | Schnoor | |
| 7,469,545 B2 | 12/2008 | Riley | |
| 7,540,142 B2 | 6/2009 | Sheoran et al. | |
| 8,079,550 B2 | 12/2011 | Brill et al. | |
| 8,141,816 B2 | 3/2012 | Robbins et al. | |
| 8,439,061 B2 | 5/2013 | Baumann | |
| 8,967,530 B2 | 3/2015 | Gatzke | |
| 9,437,054 B2* | 9/2016 | Catt | G07C 5/008 |
| 2013/0074519 A1 | 3/2013 | Ertz et al. | |
| 2016/0053696 A1 | 2/2016 | Hall et al. | |
| 2016/0090915 A1* | 3/2016 | Wolff | B64D 41/00 60/794 |

FOREIGN PATENT DOCUMENTS

CN    105116867    12/2015

\* cited by examiner

*Primary Examiner* — Richard G Davis
(74) *Attorney, Agent, or Firm* — Norton Rose Fulbright Canada LLP

(57) ABSTRACT

A system and method for controlling a position of an inlet door of an auxiliary power unit are provided. A first control signal comprising instructions for opening the inlet door to a selected one of at least a first position and a second position is output. A possible failure in a feedback signal associated with the selected one of the at least first position and second position is detected and a second control signal comprising instructions for opening the inlet door to the other one of the at least first position and second position is then output.

13 Claims, 5 Drawing Sheets

SYSTEM AND METHOD FOR CONTROLLING A POSITION OF AN AUXILIARY POWER UNIT INLET DOOR

CROSS-REFERENCE TO RELATED APPLICATIONS

This patent application claims priority under 35 USC § 119(e) of U.S. provisional Application Ser. No. 62/461,053, filed on Feb. 20, 2017, the contents of which are hereby incorporated by reference.

TECHNICAL FIELD

The application relates generally to auxiliary power units and, more particularly, to controlling a position of an inlet door thereof.

BACKGROUND OF THE ART

An auxiliary power unit (APU) may be provided with an inlet door that is moveable between a closed position and one or more open positions to allow airflow into the APU and accordingly provide the desired APU functionalities.

In some existing systems, when it is impossible to determine what position the APU inlet door is in with respect to a commanded position, the APU is prevented from starting. A drawback of this approach is that necessary APU power may not be provided during emergency in-flight starts if the inlet door position feedback is failed. In addition, availability of the aircraft is significantly impacted. There is therefore a need for an improved system and method for controlling an APU.

SUMMARY

In one aspect, there is provided a method for controlling a position of an inlet door of an auxiliary power unit. The method comprises outputting a first control signal comprising instructions for opening the inlet door to a selected one of at least a first position and a second position, detecting a possible failure in a feedback signal associated with the selected one of the at least first position and second position, and outputting a second control signal comprising instructions for opening the inlet door to the other one of the at least first position and second position.

In another aspect, there is provided a system for controlling a position of an inlet door of an auxiliary power unit. The system comprises a memory, and a processing unit coupled to the memory and configured to output a first control signal comprising instructions for opening the inlet door to a selected one of at least a first position and a second position, detect a possible failure in a feedback signal associated with the selected one of the at least first position and second position, and output a second control signal comprising instructions for opening the inlet door to the other one of the at least first position and second position.

In a further aspect, there is provided a computer readable medium having stored thereon program code executable by a processor for outputting a first control signal comprising instructions for opening an inlet door of an auxiliary power unit to a selected one of at least a first position and a second position, detecting a possible failure in a feedback signal associated with the selected one of the at least first position and second position, and outputting a second control signal comprising instructions for opening the inlet door to the other one of the at least first position and second position.

DESCRIPTION OF THE DRAWINGS

Reference is now made to the accompanying figures in which.

DETAILED DESCRIPTION

Figure 1:
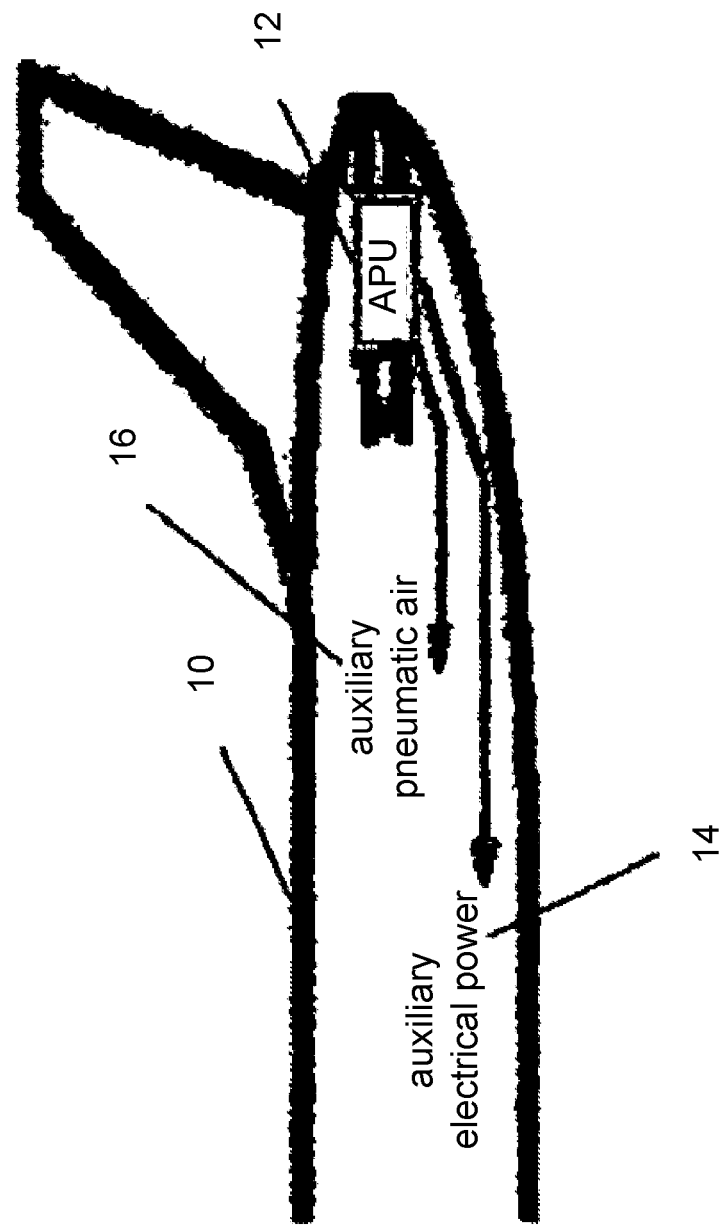
FIG. 1 is a schematic representation of an aircraft including an APU, in accordance with an illustrative embodiment.

Referring to FIG. 1, in one embodiment, an aircraft 10 has mounted thereon an APU 12, which is provided for conventional purposes, including, but not limited to, the provision of electrical power 14 and pneumatic air 16 to the aircraft 10. Among other well-known uses, pneumatic air 16 provided by the APU 12 is used on larger aircraft to provide auxiliary bleed air for starting the aircraft's main engines (not shown).

Figure 2:
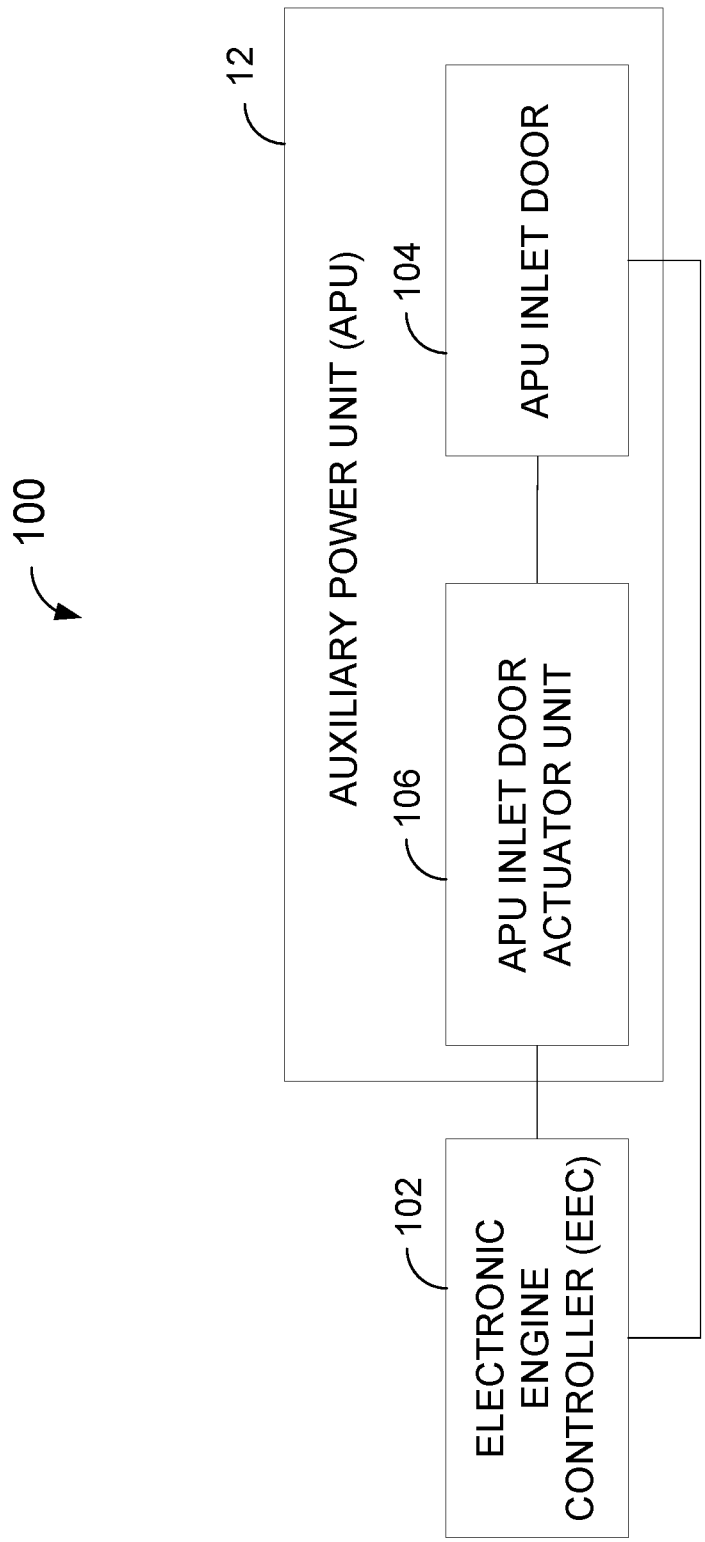
FIG. 2 is a block diagram of a system for controlling a position of an inlet door of the APU of FIG. 1, in accordance with an illustrative embodiment.

FIG. 2 illustrates an example system 100 for controlling a position of an inlet door of a gas turbine engine, such as the APU 12 of FIG. 1. As illustrated in FIG. 2, the system 100 comprises an Electronic Engine Controller (EEC) 102, which controls the APU's inlet door 104. The EEC 102 sends position commands (e.g. in the form of one or more control signal(s)) to an APU inlet door actuator unit 106, which causes the APU inlet door 104 to be operated as commanded during normal operation. In one embodiment, the APU inlet door actuator unit 106 comprises a computer (not shown) coupled to an actuator (not shown) configured to move the APU inlet door 104 to a commanded position. The commands send by the EEC 102 may comprise a "Not Powered" command, which results in the APU inlet door actuator unit 106 sending no command to the APU inlet door 104 (i.e. not commanding the APU inlet door 104 to any of the predetermined positions). The commands sent by the EEC 102 may also comprise position commands, which cause the APU inlet door 104 to be moved to one or more commanded positions. The APU inlet door 104 is moved between a closed position and one or more open positions in which air is allowed to flow into the APU to provide desired APU functionality. It is desirable for the APU inlet door 104 to be open while the APU is running but closed when the APU is not operating so as to reduce drag to the aircraft in flight and prevent foreign object ingestion while on ground.

In one embodiment, the APU inlet door 104 has two predetermined open positions, namely a "Partially Open" position and a "Fully Open" position, with the opening angle of the APU inlet door 104 in the "Fully Open" position being greater than the opening angle of the APU inlet door 104 in the "Partially Open" position. In one embodiment, the opening angle associated with the "Fully Open" position is thirty-five (35) degrees and the opening angle associated with the "Partially Open" position is thirty (30) degrees. It should however be understood that other opening angles may apply. In one embodiment, during normal start, the EEC 102 selects the inlet door opening angle based on the aircraft's airborne status and causes the door position to be transitioned at the end of the APU start in order to allow for immediate load application. The EEC 102 also receives from the APU inlet door 104 feedback of the inlet door's position, thereby allowing the EEC 102 to monitor the position of the APU inlet door 104 in real-time.

In one embodiment, the position feedback is given by two (2) discrete inputs (referred to herein as discrete A and discrete B), with each combination of discrete inputs being interpreted differently. When both discrete inputs have a value of zero (0), it can be concluded that the received feedback indicates that the APU inlet door 104 is between two of the predetermined positions. This state is referred to as being "In Transition" from one position to the next and during this transition, the exact position of the APU inlet door 104 is undetermined.

Figure 3:
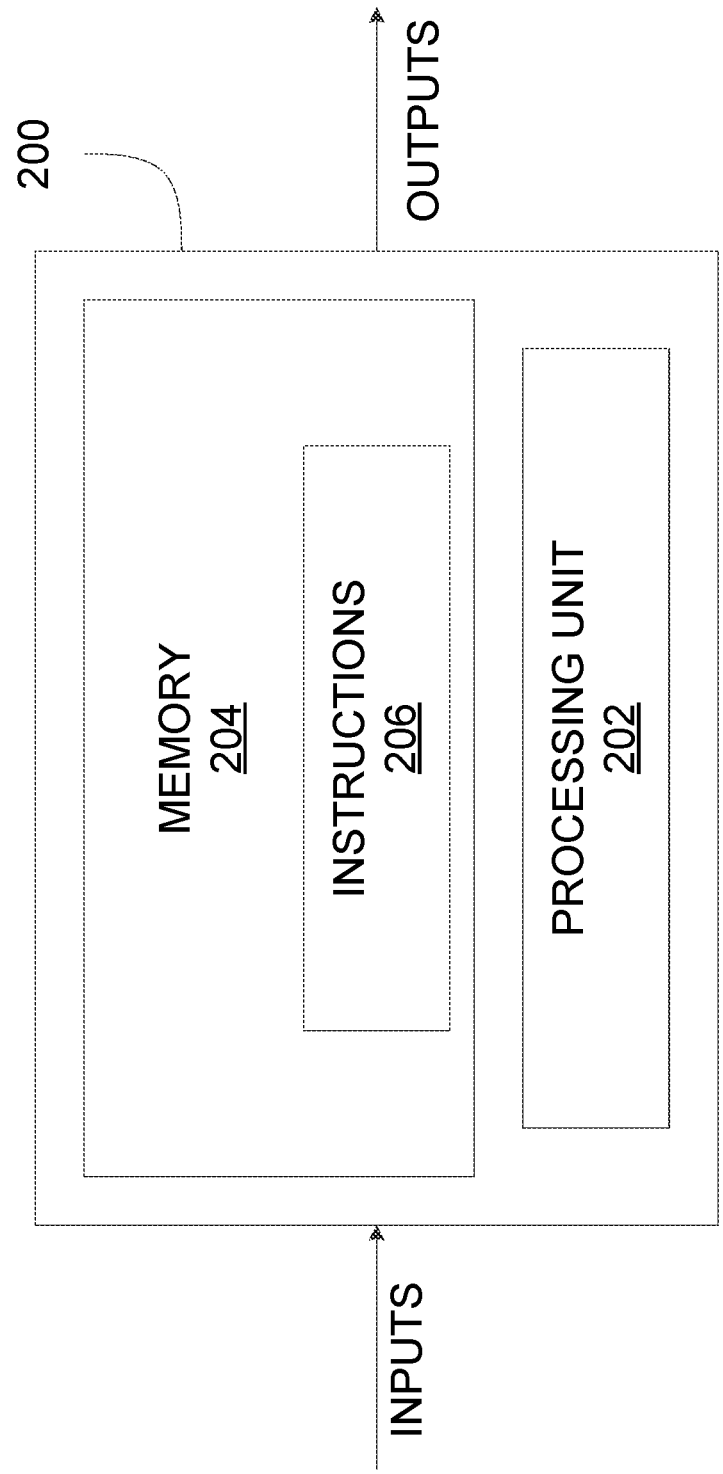
FIG. 3 is a block diagram of a computing device for implementing the electronic engine controller of FIG. 2, in accordance with an illustrative embodiment

FIG. 3 is an example embodiment of a computing device 200 for implementing the EEC 102 described above with reference to FIG. 2. The computing device 200 comprises a processing unit 202 and a memory 204 which has stored therein computer-executable instructions 206. The processing unit 202 may comprise any suitable devices configured to cause a series of steps to be performed such that instructions 206, when executed by the computing device 200 or other programmable apparatus, may cause the functions/acts/steps specified in the method described herein to be executed. The processing unit 202 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 204 may comprise any suitable known or other machine-readable storage medium. The memory 204 may comprise non-transitory computer readable storage medium, for example, but not limited to, an electronic, magnetic, optical, electromagnetic, infrared, or semiconductor system, apparatus, or device, or any suitable combination of the foregoing. The memory 204 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 204 may comprise any storage means (e.g., devices) suitable for retrievably storing machine-readable instructions 206 executable by processing unit 202.

Figure 4:
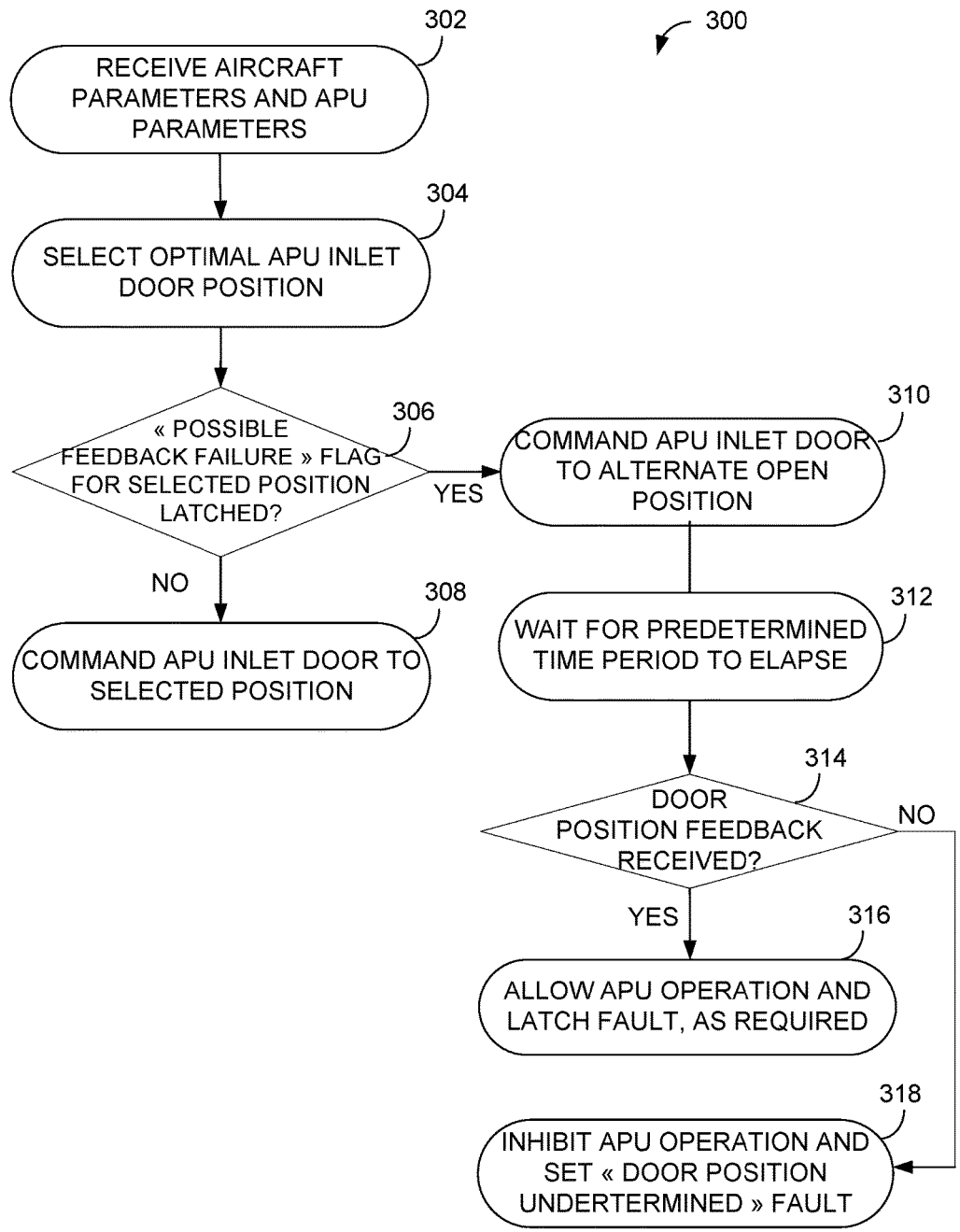
FIG. 4 is a flowchart of a method for controlling a position of an inlet door of the APU of FIG. 1, in accordance with an illustrative embodiment.

Referring now to FIG. 4, an example method 300 for controlling a position of an inlet door of a gas turbine engine (e.g. an APU) will now be described. The method 300 may be implemented by the computing device 200 of FIG. 3. As will be discussed further below, the method 300 allows the APU to start and operate even in the presence of a single point failure in the APU inlet door feedback signal (i.e. a failure in the feedback signal associated with either the "Fully Open" position or the "Partially Open" position). In this manner, rather than being unavailable, the APU is allowed to operate in a mode of operation in which the capabilities of the APU are degraded and not optimal (referred to herein as a "degraded" mode of operation). For this purpose, when one point of failure in the APU inlet door position feedback signal is detected, the EEC (reference 102 in FIG. 2) provides an alternate door command to move the APU inlet door to a secondary (or alternate) position.

In particular, if the APU inlet door (reference 104 in FIG. 2) has been commanded "Fully Open" but no feedback confirmation that the door 104 is in either of the predetermined door positions has been received (possibly due to a failure in the "Fully Open" feedback signal), the APU inlet door 104 is commanded to the alternate open position, i.e. the "Partially Open" position. Similarly and as will be further discussed below, if the APU inlet door 104 has been commanded "Partially Open" but no feedback confirmation that the door 104 is in the commanded "Partially Open" position has been received (possibly due to a failure in the "Partially Open" feedback signal), the APU inlet door 104 is commanded to the alternate open position, i.e. the "Fully Open" position. It should be understood that, if both the "Fully Open" and the "Partially Open" positions are failed, the APU is prevented from running. It should also be understood that the system and method discussed herein do not provide for accommodation of the "Closed" door position feedback (i.e. do not allow the APU to run in this case) as no acceptable alternate position exists.

Still referring to FIG. 4, the method 300 comprises, at step 302, receiving aircraft parameters (e.g. aircraft speed, altitude, and the like) and APU parameters (e.g. APU rotational speed, exhaust temperature, and the like) and selecting on the basis of the received parameters an optimal APU inlet door position (step 304). In particular, step 304 comprises selecting, among the "Fully Open" position and the "Partially Open position", the most optimal position for the current flight conditions indicated by the received aircraft and APU parameters. The method 300 then assesses at step 306 whether the flag indicating a possible failure in the feedback signal associated with the position selected at step 304 (referred to herein as "Possible Feedback Failure" flag) is present. If it is determined at step 306 that the "Possible Feedback Failure" flag is not latched for the selected position, meaning that the feedback associated with the optimal door position is believed to be healthy, the APU inlet door is commanded to the selected optimal position at step 308. Otherwise, the APU inlet door is commanded to the alternate open position at step 310.

After the APU inlet door has been commanded to the alternate position at step 310, the next step 312 is to wait for a predetermined time period to elapse before assessing (step 314) whether a door position feedback has been received by the EEC. In other words, the alternate position is commanded for the duration of a predetermined time period prior to assessing whether the APU inlet door is in the new commanded position. In one embodiment, the predetermined time period is eight (8) seconds. It should be understood that other suitable time periods may apply. If the door position feedback received at step 314 indicates that the APU inlet door has reached the commanded position, APU operation is allowed (e.g. the EEC will respond to an APU start command) in a degraded mode of operation and a fault is latched to indicate to the cockpit that the APU is running in degraded mode (step 316). If the received door position feedback indicates that the current position of the APU inlet door is the closed position, a "Door Stuck Closed" fault is latched and APU operation is inhibited (e.g. the EEC will not respond to an APU start command or will shutdown the APU if the APU has already started). Otherwise, if it is determined at step 314 that the door position feedback has not been received, a "Door Position Undetermined" fault, which indicates that the current position of the APU inlet door is undetermined, is set and APU operation is inhibited (step 318).

Figure 5:
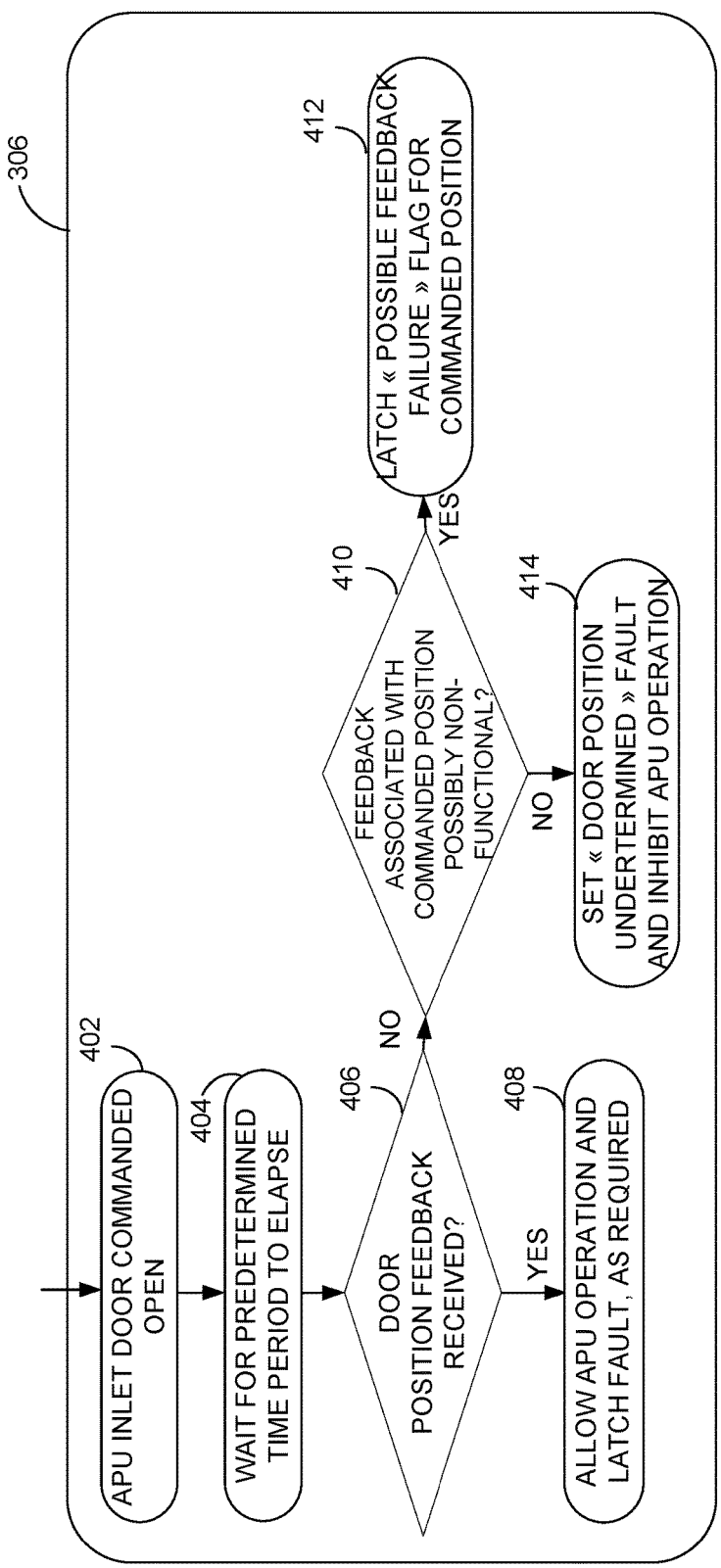
FIG. 5 is a flowchart of the logic for detecting a possible failure in a position feedback signal, in accordance with an illustrative embodiment.

Referring now to FIG. 5, the logic for detecting a possible failure in the position feedback signal (e.g. detecting that the "Possible Feedback Failure" flag is latched at step 306 of FIG. 4), in accordance with one embodiment, will now be described. In one embodiment, detection and accommodation of the "Possible Feedback Failure" conditions are continuously performed in parallel. The APU inlet door is commanded to the optimal open position (i.e. to the "Fully Open" or the "Partially Open" position selected at step 304 of FIG. 4) at step 402. The next step 404 is to wait for a predetermined time period to elapse before assessing (step 406) whether the door position feedback signal has been received. The predetermined time period is based on the expected travel time from the APU inlet door closed position to the "Fully Open" position. In one embodiment, the predetermined time period is fifteen (15) seconds. It should be understood that other suitable time periods may apply. If it is determined at step 406 that a position feedback signal has been received, normal APU operation occurs at step 408. A fault may also be latched, as required. For example, a fault may be latched (and APU operation inhibited) if the received door position feedback indicates that the door is currently in the "Closed" position although it was commanded open at step 402. A fault may also be latched (and APU operation allowed) if the received door position feedback indicates that the door is currently in the alternate open position relative to the one commanded at step 402.

Otherwise, if it is determined at step 406 that the door position feedback has not been received, the next step 410 is to determine whether it is possible that the position feedback signal associated with the position commanded at step 402 is non-functional (e.g. the corresponding discrete switch is failed). In one embodiment, it is considered possible that the position feedback signal associated with the "Partially Open" position may be non-functional if this feedback signal has not been active since the last power-up of the EEC. The position feedback signal associated with the "Fully Open" position may be non-functional if this feedback signal has not been active since the last power-up of the EEC and if the APU inlet door has passed in the "Partially Open" position since the APU inlet door was commanded "Fully Open" (i.e. the APU inlet door initiated a movement towards the "Fully Open" position).

If it is determined at step 410 that the feedback signal associated with the commanded position may be non-functional, the "Possible Feedback Failure" flag for the commanded position is latched (step 412). In one embodiment, the "Possible Feedback Failure" flag is only reset at the next power-up. In this manner, the APU inlet door will not be commanded to the open position which has a non-functional feedback as long as the condition is present, thereby allowing for faster door transitions. If it is determined at step 410 that the feedback signal associated with the commanded position is not possibly non-functional (i.e. there has been indications since the last power up to suggest that the feedback is healthy), it can be concluded that the absence of feedback signal is not due to a failure of the discrete switch associated with the commanded position but to an unknown failure. Therefore, the next step 414 is to inhibit APU operation and set a "Door Position Undetermined" fault. Such a fault indicates that the current APU inlet door position is unknown and that the APU inlet door is in some undetermined position between open and closed and cannot be controlled.

As discussed above, using the system and method described herein, accommodation of a single point of failure in the APU inlet door position feedback system can be achieved. In particular, by providing an alternate door command, the APU is allowed to start and operate in a degraded mode of operation even in the presence of such a failure.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A method for controlling a position of an inlet door of an auxiliary power unit, the method comprising:
    outputting a first control signal comprising instructions for opening the inlet door to a selected one of at least a first position and a second position;
    detecting a possible failure in a feedback signal associated with the selected one of the at least first position and second position; and
    outputting a second control signal comprising instructions for opening the inlet door to the other one of the at least first position and second position.

2. The method of claim 1, wherein the first control signal is output as comprising instructions for opening the inlet door to one of a fully open position and a partially open position, an opening angle of the inlet door at the fully open position greater than an opening angle of the inlet door at the partially open position.

3. The method of claim 1, further comprising:
    determining, a predetermined time period after the second control signal is output, whether a door position feedback signal has been received;
    if the door position feedback signal has been received and indicates that the inlet door is in an open position, allowing operation of the auxiliary power unit; and
    if the door position feedback signal has not been received or if the door position feedback signal has been received and indicates that the inlet door is in a closed position, inhibiting operation of the auxiliary power unit.

4. The method of claim 1, wherein detecting the possible failure in the feedback signal comprises determining, a predetermined time period after the first control signal is output, that no door position feedback signal has been received and that the feedback signal associated with the selected one of the at least first position and second position is possibly non-functional.

5. The method of claim 4, wherein determining that that the feedback signal associated with the selected one of the at least first position and second position is possibly non-functional comprises determining that the feedback signal associated with the selected one of the at least first position and second position has been inactive since a last power-up.

6. The method of claim 4, wherein determining that the feedback signal associated with the selected one of the at least first position and second position is possibly non-functional comprises determining that the inlet door has initiated movement towards the selected one of the at least first position and second position.

7. A system for controlling a position of an inlet door of an auxiliary power unit, the system comprising:
    a memory; and a processing unit coupled to the memory and configured to:
    output a first control signal comprising instructions for opening the inlet door to a selected one of at least a first position and a second position;
    detect a possible failure in a feedback signal associated with the selected one of the at least first position and second position; and
    output a second control signal comprising instructions for opening the inlet door to the other one of the at least first position and second position.

8. The system of claim 7, wherein the processing unit is configured to output the first control signal as comprising instructions for opening the inlet door to one of a fully open position and a partially open position, an opening angle of the inlet door at the fully open position greater than an opening angle of the inlet door at the partially open position.

9. The system of claim 7, wherein the processing unit is configured to:
    determine, a predetermined time period after the second control signal is output, whether a door position feedback signal has been received;
    if the door position feedback signal has been received and indicates that the inlet door is in an open position, allow operation of the auxiliary power unit; and
    if the door position feedback signal has not been received or if the door position feedback signal has been received and indicates that the inlet door is in a closed position, inhibit operation of the auxiliary power unit.

10. The system of claim 7, wherein the processing unit is configured to detect, a predetermined time period after the first control signal is output, that no door position feedback signal has been received and that the feedback signal associated with the selected one of the at least first position and second position is possibly non-functional.

11. The system of claim 10, wherein the processing unit is configured to determine that the feedback signal associated with the selected one of the at least first position and second position is possibly non-functional comprises determining that the feedback signal associated with the selected one of the at least first position and second position has been inactive since a last power-up.

12. The system of claim 10, wherein the processing unit is configured to determine that the feedback signal associated with the selected one of the at least first position and second position is possibly non-functional comprising determining that the inlet door has initiated movement towards the selected one of the at least first position and second position.

13. A computer readable medium having stored thereon program code executable by a processor for:
    outputting a first control signal comprising instructions for opening an inlet door of an auxiliary power unit to a selected one of at least a first position and a second position;
    detecting a possible failure in a feedback signal associated with the selected one of the at least first position and second position; and
    outputting a second control signal comprising instructions for opening the inlet door to the other one of the at least first position and second position.

* * * * *